Figure 4:
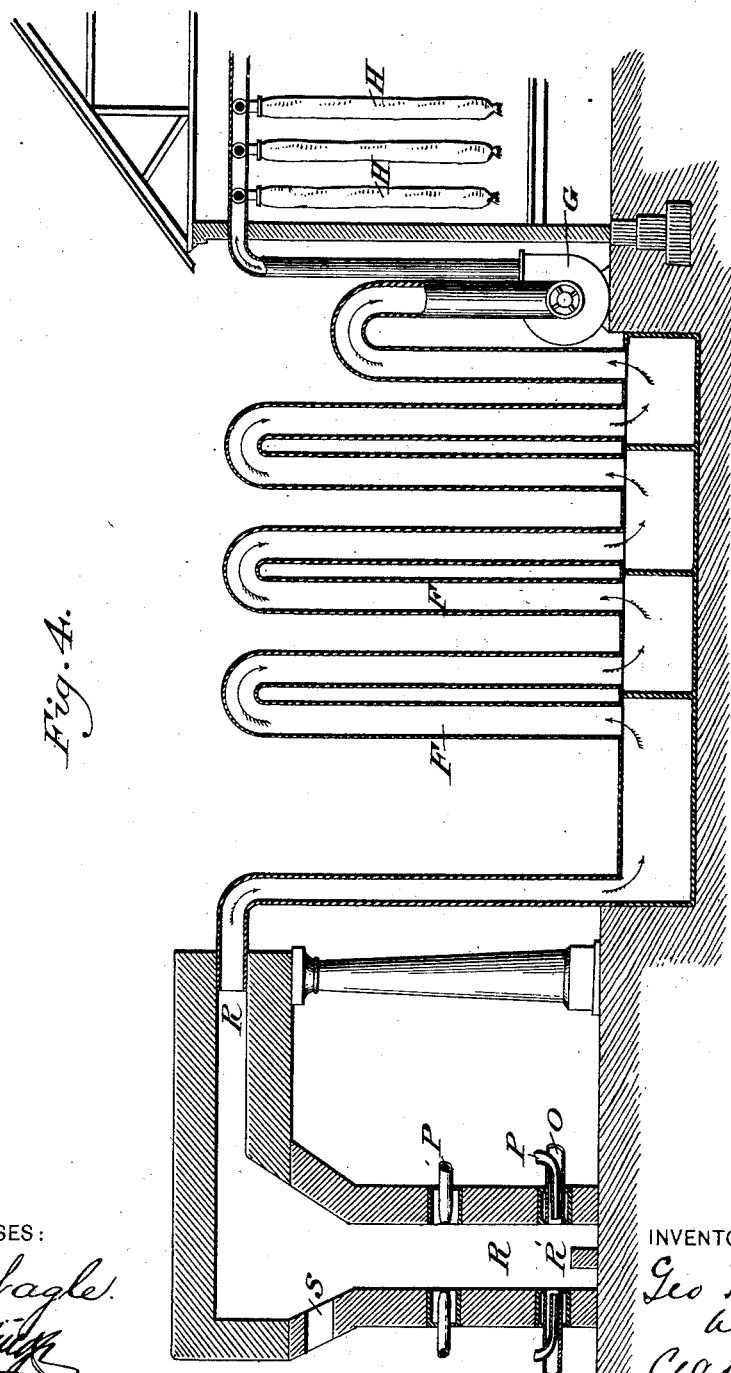

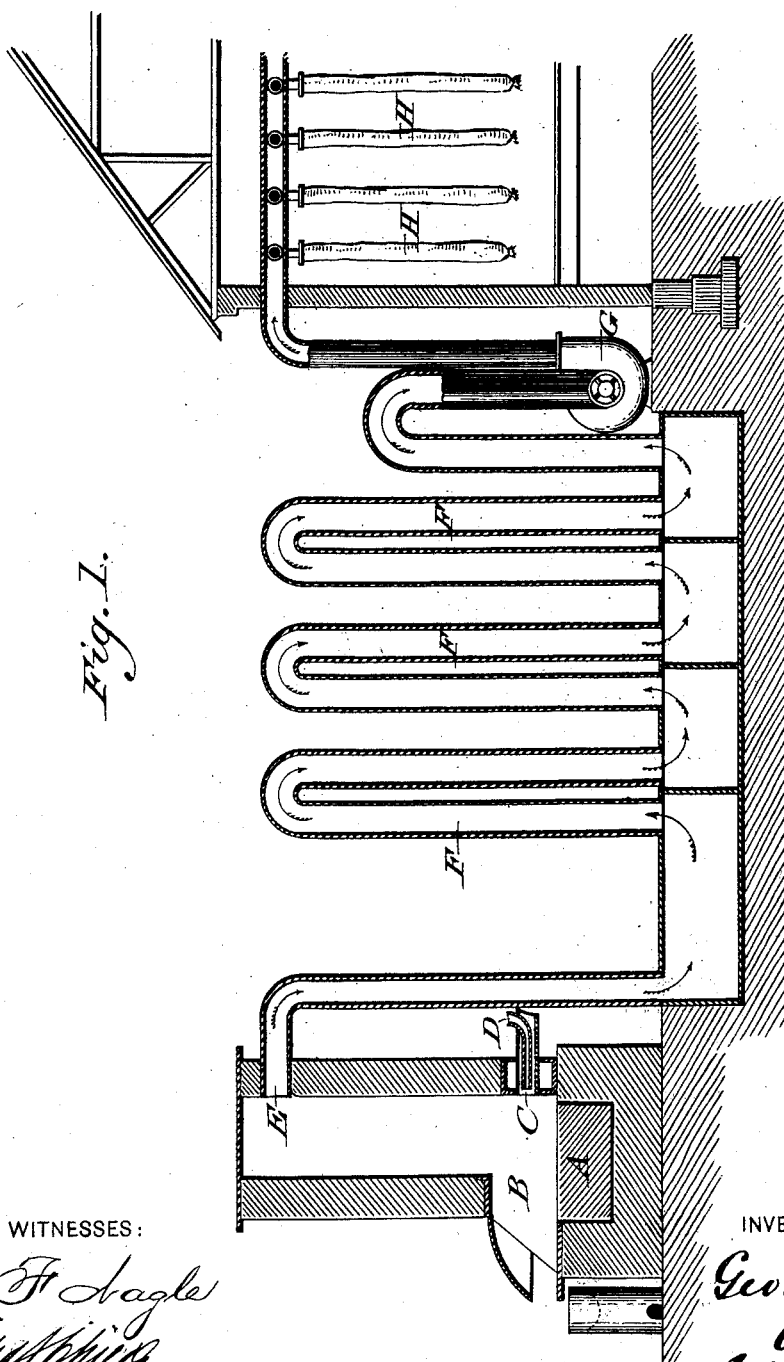

(No Model.) 3 Sheets—Sheet 2.
G. T. LEWIS.
PROCESS OF MANUFACTURING SUBLIMED LEAD PIGMENTS FROM LEAD ORES.
No. 364,268. Patented June 7, 1887.
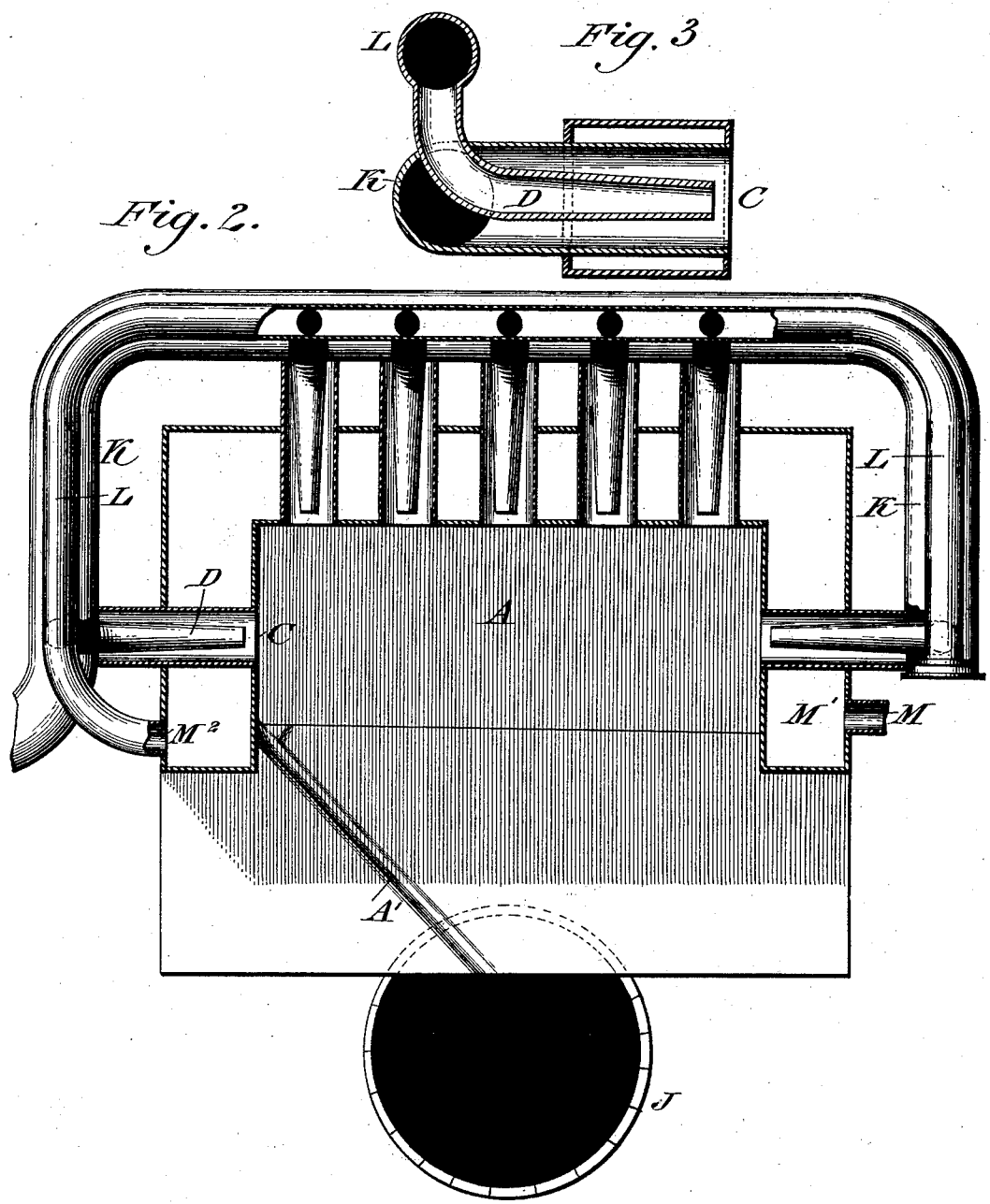

(No Model.)

G. T. LEWIS.
PROCESS OF MANUFACTURING SUBLIMED LEAD PIGMENTS FROM LEAD ORES.

3 Sheets—Sheet 3.

No. 364,268. Patented June 7, 1887.

WITNESSES:
INVENTOR

UNITED STATES PATENT OFFICE.

GEORGE T. LEWIS, OF PHILADELPHIA, PENNSYLVANIA.

PROCESS OF MANUFACTURING SUBLIMED LEAD PIGMENTS FROM LEAD ORES.

SPECIFICATION forming part of Letters Patent No. 364,268, dated June 7, 1887.

Application filed December 20, 1886. Serial No. 222,111. (No model.)

*To all whom it may concern:*

Be it known that I, GEORGE T. LEWIS, of the city and county of Philadelphia, State of Pennsylvania, have invented a new and useful Improvement in the Process of Manufacturing Sublimed Lead Pigments from Lead Ores, of which the following is a true and exact description, due reference being had to the drawings which accompany and form part of this specification.

My improvement consists in the use of natural gas, artificial gas, or liquid hydrocarbons in the manner hereinafter to be described. The gas or liquid hydrocarbon is introduced into the furnace used in such a manner that it becomes intimately mixed with the air-blast blown into the furnace. This admixture of air and gas forms a perfect combustion, causing an intense heat, whereby a more perfect volatilization of the lead ores is obtained than can be now obtained by the use of coke or any other fuel now used. By the use of gas or liquid hydrocarbons the discoloring effect of the coke or other fuel now in use is entirely obviated, and a purer article is obtained.

By reference to the drawings a detailed description of the process and the means by which it is carried out may be clearly seen.

The ore to be treated is crushed and placed in a modified Scotch-hearth furnace of peculiar construction, (shown in Figs. 1, 2, and 3,) in which A represents the hearth upon which the ore is placed.

K represents a pipe carrying gas.

L represents a pipe carrying the air, which is blown out through an opening, M, and passes around the furnace by the aperture M', entering the pipe L through the opening M². By this means the air becomes highly heated.

C represents various openings for the gas into the furnace, and D various openings for the air into the furnace. The air and gas entering the furnace by these openings become intimately mixed on their entrance to the furnace, thereby producing a flame of intense heat. A portion of the lead ore in the hearth A is reduced to slag, a portion to metal, and a portion volatilized. The slag is removed. That portion which is reduced to metallic lead flows off through the groove A' (Fig. 2) in the hearth-stone into the small furnace D, where it is molded into pigs. That portion of the lead ore which is volatilized is drawn through the cooling-pipes by the fan G, and is condensed in the bags H, made of textile fabric. The slag and the condensed waste fumes caught in the bags H are now treated by the second portion of this process, and this is shown in Fig. 4, in which R represents a low cupola-furnace with two rows of tuyeres. Through the lower of these tuyeres, both air and gas are blown, the air entering by pipe P and the gas by pipe O, as may be seen. Upon their entrance into the furnace they are intimately mixed. The waste fumes and slag, heretofore described, together with sufficient coke to hold the charge up, are thrown into the furnace through the opening S. The ignited mixture of air and gas produces an intense heat, by which a great percentage of the metal in the mass of slag and waste fumes is volatilized, forming a pigment compound mainly of sulphate and oxide of lead, while a portion of the metal smelts down and runs out, together with the glassy slag, through the opening R'. The volatile materials (fumes) are again drawn from the furnace through the cooling-pipes F, by means of the fan G, and collected in the textile receptacles H.

I do not claim, broadly, the use of gas as a fuel in the manufacture of lead pigments.

Having now fully described my improvement, what I desire to claim, and protect by Letters Patent, is—

The improved process of manufacturing sublimed lead pigment from lead ores, which consists in heating the ore in a modified Scotch-hearth furnace, where the heat is obtained by igniting an admixture of air and gas, and then treating the slag and waste fumes produced in this furnace in a pigment-furnace or low shaft furnace in which air and gas enter together through tuyeres near the bottom of the furnace for the purpose of producing heat, and the gas acts as a reducing agent, and air is blown in through the tuyeres near the top of the charge, and the waste fumes produced in this furnace after being cooled are collected in receptacles made of textile material.

GEORGE T. LEWIS.

Witnesses:
RICHD. S. CHILD, Jr.,
JOSHUA MATLACK, Jr.